(12) United States Patent
Levin (10) Patent No.: US 7,840,650 B2
(45) Date of Patent: Nov. 23, 2010

(54) SHARING OF DIGITAL MEDIA ON A NETWORK

(75) Inventor: Yakov Jack Levin, Los Gatos, CA (US)

(73) Assignee: Imageshack Corp., Los Gatos, CA (US)

( * ) Notice: Subject to any disclaimer, the term of this patent is extended or adjusted under 35 U.S.C. 154(b) by 0 days.

(21) Appl. No.: 11/743,626

(22) Filed: May 2, 2007

(65) Prior Publication Data

US 2007/0266115 A1 Nov. 15, 2007

Related U.S. Application Data

(60) Provisional application No. 60/799,224, filed on May 9, 2006.

(51) Int. Cl.
*G06F 15/16* (2006.01)
(52) U.S. Cl. .................................. 709/219
(58) Field of Classification Search ................ 709/203, 709/217–219, 227, 231, 238; 715/206, 208, 715/234, 700, 748, 769
See application file for complete search history.

(56) References Cited

U.S. PATENT DOCUMENTS

| | | | | |
|---|---|---|---|---|
| 5,890,170 | A * | 3/1999 | Sidana | 715/207 |
| 7,536,641 | B2 * | 5/2009 | Rosenstein et al. | 715/234 |
| 2002/0065741 | A1 * | 5/2002 | Baum | 705/26 |
| 2003/0158928 | A1 * | 8/2003 | Knox et al. | 709/223 |
| 2004/0109197 | A1 * | 6/2004 | Gardaz et al. | 358/1.15 |
| 2004/0230663 | A1 * | 11/2004 | Ackerman | 709/207 |
| 2004/0252123 | A1 * | 12/2004 | Estrada et al. | 345/501 |
| 2005/0246651 | A1 | 11/2005 | Krzanowski | |
| 2006/0259462 | A1 * | 11/2006 | Timmons | 707/3 |
| 2007/0250511 | A1 * | 10/2007 | Endler et al. | 707/10 |
| 2009/0327101 | A1 * | 12/2009 | Sayed | 705/27 |

OTHER PUBLICATIONS

Digitalmediaminute.com, Gmail, Picasa and Flickr, http://digitalmediaminute.com/article/1299/gmail-picasa-and-flickr, [online], [Retrieved on Dec. 13, 2007, Last modified on Mar. 12, 2005], Retrieved from the Internet ,URL: < http://digitalmediaminute.com/article/1299/gmail-picasa-and-flickr>.
Flock.com, User Guides, http://www.flock.com/user-guide/1.0/advshar.html, [Retreived on Dec. 13, 2007], Retrieved from the internet, URL:< http://www.flock.com/user-guide/1.0/advshar.html>.

(Continued)

*Primary Examiner*—Benjamin R Bruckart
*Assistant Examiner*—Scott M Sciacca
(74) *Attorney, Agent, or Firm*—Fenwick & West LLP (57) ABSTRACT

A method (and a system) for a computer user to share files by publishing references to them at websites, e.g., by filling HTML forms. This method allows the user to transparently upload said files to a third party hosting service. Files which originally reside on the user's computer are automatically uploaded to the third party hosting service and references to them are inserted into the HTML form at the publishing website.

27 Claims, 9 Drawing Sheets

OTHER PUBLICATIONS

Gotomobile.com, New Flickr Upload Tool Mobup, http://www.gotomobile.com/archives/new-flickr-upload-tool-mobup, [online], [Retrieved on Dec. 13, 2007, Last modified on Nov. 30, 2005], Retrieved from the Internet, URL:< http://www.gotomobile.com/archives/new-flickr-upload-tool-mobup>.

Imageshack.us, ImageShack Home page, http://www.imageshack.us/, [online], [Retreived on Dec. 13, 2007], Retrieved from the internet, URL:< http://www.imageshack.us/>.

PCWorld.com, Browse by topic "Image Toolbar", http://www.pcworld.com/search/results?col=down>=image+toolbar,. [online], [Retreived on Dec. 13, 2007], Retrieved from the internet, URL:< http://www.pcworld.com/search/results?col=down>=image+toolbar >.

Technobuzz.net, Image Toolbar Firefox Extension—Download of the Day http://www.technobuzz.net/image-toolbar-firefox-extension-download-of-the-day/, [online], [Retreived on Dec. 13, 2007, Last modified on Aug. 3, 2007], Retrieved from the Internet, URL:< http://www.technobuzz.net/image-toolbar-firefox-extension-download-of-the-day/>.

PCT International Search Report and Written Opinion, PCT/US07/68252, Jun. 18, 2008, 11 pages.

* cited by examiner

SHARING OF DIGITAL MEDIA ON A NETWORK

CROSS REFERENCE TO RELATED APPLICATIONS

This application claims the benefit of (and priority to) U.S. Provisional Application No. 60/799,224, filed May 9, 2006, and titled "Sharing of Digital Media on the Internet", the contents of which is incorporated by reference in its entirety.

BACKGROUND

1. Field of Art

The present disclosure relates generally to the field of digital media sharing on a network, and specifically, to the field of hosting and representation of digital data between network servers and end-user browsers.

2. Description of the Related Art

With conventional digital media sharing, a user makes various files located on a user computer available to the public by publishing references to the files on a publishing website (or web site). Specifically, the files first must be uploaded to a file hosting service. The file hosting service consists of network attached computers (servers) and databases. Once uploaded to the file hosting service servers, public references or universal resource locators (URLS) pointing to the uploaded files at the file hosting service servers must be published at the publishing website. A publishing website is also a network attached computer, or a group computers (servers), designed with the purpose of presenting said digital media (images, video or sound files).

The conventional sharing process involves explicit user interaction with two separate services: a publishing website and a hosting service. Currently available processes for publishing files have several deficiencies. For example, while viewing the publishing website, a user must temporary switch attention to the website of the hosting service in order to upload a file in preparation for sharing. This may involve techniques such as remembering the location of the hosting service's website, such as by using bookmarks or by opening a new browser window. These techniques are time consuming, cumbersome and error-prone.

Another problem is that sharing files is a two-step process. After files are uploaded to the hosting service, references to them must be manually transmitted to the publishing website. Again, this process is time-consuming, cumbersome, and error-prone. These problems are particularly prevelant if the user chooses to retype these references, or if the user utilizes his computer's clipboard (e.g. copy and paste). The clipboard content is often lost to do subsequent user "copy" actions, which would require a user to repeat desired copy and paste process.

Alternate solutions to uploading images to a web site typically include a desktop application. To upload in image a user launches the application and attaches the images to within that application in order to upload the image. Thereafter, the user instructs the applet to upload to a web site associated with that application. The problems with this approach include a series of steps required for the upload, the execution of an intermediary application, and having that application configured to work only with a predetermined site. This decreases overall efficiency and limits the flexibility of use.

Still another problem is when inserting references to the files into a hypertext markup language (HTML) form, the user must ensure use of the correct reference syntax. For example, different publishing websites use different syntax for referencing files, with which the user may not be familiar.

Thus, the present art lacks an easy to use process for posting media content on network sites such as a web site on the Internet.

SUMMARY

The disclosure includes embodiments of an apparatus (or system or method) to automatically post an image from a local file to a network hosting site, for example, a website. In one embodiment, the apparatus detects selection of an image from a local user system file to publish (or upload) to a website. The image can be a thumbnail, full-size, cropped, or in any other form.

In one embodiment, the apparatus detects the image being dragged onto a web page opened in a browser on the user system. The web page corresponds to the website. In one embodiment, the image is dragged onto a text area of the web page. The apparatus then automatically transmits the dragged image to a media file hosting system. The media file hosting system is separate from the website. The apparatus automatically receives an address pointer from the media file hosting system. The address pointer may be a uniform resource locator and it provides the location where the image is stored in a database of the media file hosting system. The apparatus automatically transmits the address pointer to the web page corresponding to the website.

The disclosed embodiments beneficially allow for posting (or publishing or uploading) images to a hosting site, e.g., a website, by dragging and dropping the image from a local file location on the user computer system to a web page opened in a browser on the user computer system. The image automatically gets transmitted to a media file hosting system and a pointer to its location on the media file hosting system is automatically sent to the website. The user is not required to enter in address information for the image. When the website is visited thereafter, the web browser is able to download the image from the address provided by the web page on the website.

Thus, in one embodiment, an image (or other media file) may be dragged from a desktop location onto a HTML posting field (e.g., a text field) within a web page. A browser plug-in (e.g., an upload mechanism) detects this action, uploads the image file to a media file hosting system (or service) and sends back to the browser a hypertext link pointing to the location of the image. Later, when a browser (e.g., the same or another one) retrieves the web page, that browser retrieves the hyperlinks within it and renders the media file corresponding to the hyperlink with the web page. A benefit of this system and process is that it is both application and web site agnostic with respect to being able to efficiently and easily upload media files within a web page.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF THE DRAWINGS

The disclosed embodiments have other advantages and features which will be more readily apparent from the following drawings, detailed description and the appended claims. A brief description of the drawings is provided below.

DETAILED DESCRIPTION

The Figures (FIGS.) and the following description relate to preferred embodiments of the disclosure by way of illustration only. It should be noted that from the following discussion, alternative embodiments of the structures and methods disclosed herein will be readily recognized as viable alternatives that may be employed without departing from the principles of the embodiments disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and methods illustrated herein may be employed without departing from the principles described herein.

Generally, the disclosed embodiments describe a mechanism and process for simplifying publishing (or uploading or posting) of a file, e.g., an image, to a web page (opened in a browser program) through a "drag and drop" operation. Although the file appears to be dragged and dropped onto the web page, the file is actually transmitted to and stored at a separate file hosting system database. The file hosting system transmits address locator information, e.g., a uniform resource locator (URL) address, pointing to the stored image in its database to a mechanism on the user system. This mechanism transmits, without user intervention, the address locator information to the web page. When the web page is rendered, the browser rendering the web page retrieves the image from the address locator and displays it within the web page of the browser.

Process Overview

Figure 1:
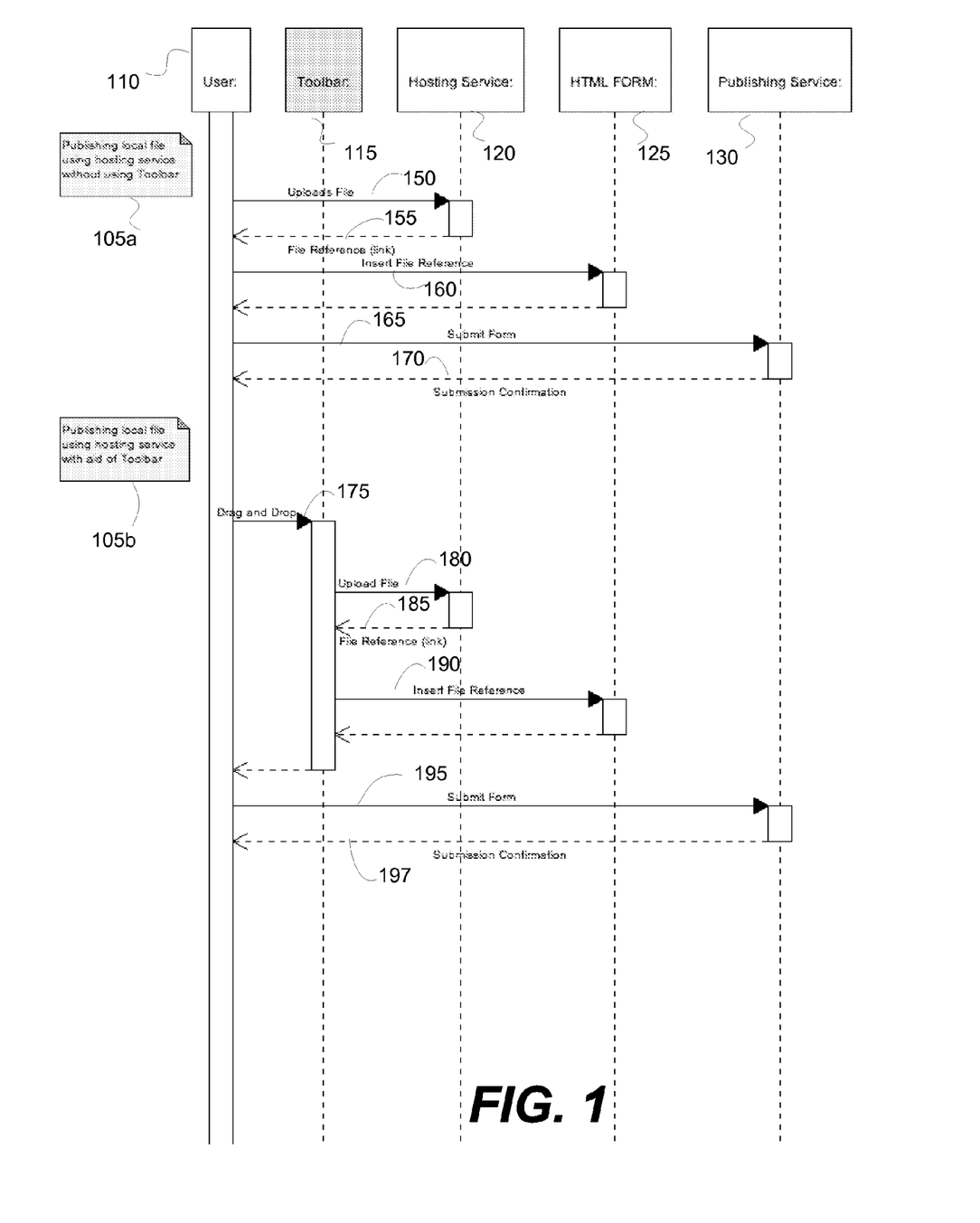
FIG. 1 illustrates a process for user interaction to publish (or post or upload) a file (e.g., an image) to a web page in accordance with one embodiment of the present invention.

FIG. 1 illustrates one embodiment of a process for user interaction to publish (or upload or post) a file (e.g., an image) to a web page. For ease of understanding and for purposes of illustration only, in this FIG., boxes at the top represent actors and arrows represent control flow, distributed by time on the vertical axis. Each solid arrow represents a call, or request, with control going to the actor to which the arrow is pointing. Each dotted arrow represents a return of control or a response which returns control back to the party to which the arrow is pointing.

FIG. 1 makes references to two example scenarios. The first example scenario 105a begins with a user 110 editing a web page, e.g., a digital journal (blog) entry at a website, e.g., LiveJournal.com. The web page is opened within a browser application on a user computer system. The user locates on the website a hyper text markup language (HTML) form to type an entry. For example, the use may type: "These are photographs of myself standing near the Eiffel Tower from my last vacation in Europe."

Next, the user visits the website of a file (e.g., an image) hosting service in order to upload a file (e.g., an image) that will be posted. In this example scenario, the user opens a new browser window and accesses the media file hosting system (e.g., www.ImageShack.us). Thereafter, the user uploads an image from his computer. Note that the media file hosting system also may be referred to as a media file hosting service. In addition, although the description is in the context of images, other media files are applicable, for example, video, audio, or graphics files.

The process of uploading in the first example scenario 105a is further described herein. Generally, a user starts with selecting a "browse" function from a user computer system to find one or more images to upload 150. Once the one or more images are selected, a user selects (or presses) an OK/Open button or other action that notes that each images has been selected and can be immediately uploaded to the hosting service 120. Optionally, the user may manually select an upload button to start the upload of each image to the hosting service 120. The process continues with uploading the images to the hosting service 120. Next, a window displays a reference code (or linking code) 155, e.g., within a box, received from the hosting service 120 for each corresponding image that is uploaded. Depending on how the image may be used, the appropriate reference code is selected by the user 110 and inserted 160 as a file reference.

It is noted that in one embodiment reference code comprises a URL that a user selects depending on how they want to represent an image on the publishing website. The reference code may correspond with an image URL. For example, an image alone may not provide any ability to link to a particular address location. However, in accordance with the embodiments discloses, a reference code associated with the image allows for direction to that address when the image is selected (e.g., clicked).

As previously noted, a user may select the particular reference code for an image. In one embodiment, the user may be presented with three different reference codes corresponding to three different image presentations: (1) a URL for a thumbnail, (2) a URL for full size image, and (3) a number of bulletin board type URLs. The user selects the URL that they desire for the publishing website. It is noted that if a user has installed a toolbar, for example, as illustrated and described with FIGS. 3b and 3c, a user selects TYPE OF URL to choose between the images and associated reference codes. It also is noted that in some embodiments, a reference code may not be selected. For example, a user that does not desire an image to be selectable (e.g., clickable), may elect not to select a reference code.

After a successful upload, the user notes the URL of uploaded image, as well as the image's respective reference code, and then goes back to the posting window on LiveJournal.com. In the posting window, the user finds the HTML form again, and inserts the image's URL as well as the image's respective reference code into the text area location of the LiveJournal.com HTML form. The text area location is the area where the user is currently entering text for a post in order to share the image. The user matches up the reference code (which also may be referred to as a linking code) with the publishing website in order to use the correct reference syntax. The user presses the submit button located on the LiveJournal.com HTML form 125 in order to submit 165 (or publish) his post to the publishing service 130 with the URL of the image within it. An optional confirmation is sent back 170 to the user.

The above steps typically are repeated for every image that the user wants to share. The process in example scenario one is similar in some aspects to conventional, complex uploading processes that involve manipulation of multiple browser windows, visiting additional websites, remembering or copying URLs (as well as their respective reference codes), remembering reference syntax for many websites, and requires knowledge of HTML markup.

Example scenario two 105b (bottom portion of FIG. 1) illustrates one embodiment of a further streamlined uploading process. In this example embodiment an upload mechanism interoperable with the browser application is operational during the process. The user 110 begins by editing his digital journal (blog) entry at LiveJournal.com. Again, the user 110 finds the HTML form 125 to type an entry. Again, by way of example, the user 110 types: "These are photographs of myself standing near the Eiffel Tower from my last vacation in Europe."

At this point, the user 110 selects an "upload" option from an upload mechanism, e.g., toolbar, 115 integrated with a web browser. The upload mechanism 115 opens a folder or file from which the user 110 can select one or more images. In one embodiment, the folder or file corresponds with an operating system file manager, e.g., Windows Explorer or Macintosh Finder. The user 110 "drags" 175 the selected images, e.g., using a pointing device such as a mouse, trackball, or touchpad, from the folder or file over to the text area location of the LiveJournal.com HTML form 125 and "drops" 175 it within that area. The text area location is where the user is currently typing a post.

Once dropped in the text area, the selected images are transparently (and automatically) uploaded 180 to the file hosting service 130. Once the upload completes, the upload mechanism 115 receives 185 from the hosting service 120 one or more file references. Each file reference is an address location pointer (e.g., a uniform resource locator (URL) address) for the location of a particular version (full size, lower resolution, thumbnail, etc.) of each image in the hosting service system 120.

The upload mechanism 115 then prepares and transmits HTML syntax to insert 190 a correctly-formatted address location pointer and respective reference code for each image into the text area at the position of the mouse cursor on the web page in the web browser. The user presses a submit button located on the LiveJournal.com HTML form in order to submit 195 the post to the publishing service 130 for publishing on the web site, complete with the images, which are hosted at the hosting service. An optional confirmation is sent back 197 to the user.

It is noted the processes described in FIG. 1 may be embodied in software, hardware, or a combination thereof. For example, instructions storable on a computer readable medium (e.g., a memory or a disk) may be executable by a processor. When the instructions are executed they cause the processor to perform some function. The processor can be a general purpose processor or a specific function defined processor. Additional details of such components are provided below.

Hosting Service and System

Turning next to a discussion of the hosting service (and system), e.g., the hosting service 120, in one embodiment the hosting service may be a media/file hosting service that receives media or files through a TCP/IP protocol. The hosting service is configured to return reference data back to the user (or client) 110, and more specifically, to a browser or applet (e.g., JAVA applet) executing on a user system (e.g., as a browser plug-in). The browser or applet on the user system may be used to construct appropriate reference links or URLs to files on the hosting service 120.

The hosting service 120 includes one or more server (or services) systems. The server system includes processing and communication servers (or services) and databases. Each server system may be configured to be physically or logically separate. Alternatively, each server system may be configured to be physically or logically together.

By way of example, one server system is a communications server system that is configured to receive a data file from a user (or client) system via a communications protocol (e.g., TCP/IP or UDP). Another server system is a data file server system that is configured to validate file attributes. Examples of file attributes include file size, resolution, and type. Examples of type include type of image. The file may be a still image, e.g., JPEG (.JPG), graphic interchange format (GIF), tagged image file format (TIFF), etc., or a video file, e.g., MPEG (MPG), audio video interleave (AVI), Real Media (RM), etc. An example file attribute may provide the following data for an image: a JPG image type, 100 kilobytes in size, and resolution of 300×250 pixels.

Another server system is a data storage server system that is configured to store the data file on a storage device, for example, within a database. The location, e.g., a location address (or address pointer), of the data file in the database is identified so that the image can be subsequently retrieved when the communications server receives a request for that data file at the particular address. It is noted that the address may be a publicly accessible uniform resource locator (URL) address. The previously described communication server system also is configured to respond back to the user system with the file attribute information and the address location.

Upload Mechanism

FIGS. 2a-2d illustrate one embodiment of a process architecture for an upload mechanism (e.g., a toolbar), e.g., 115, for managing a process to publish a file. FIGS. 2a-2d illustrate a user system 210 that includes files, for example, files on a local storage (e.g., hard drive, USB drive, etc.) 210a, and an web (or Internet) browser with an upload mechanism 210b, e.g., a toolbar. Also shown is a publishing website 215 and a hosting service 220. By way of example and for ease of discussion, it is noted that the publishing web site 215 is functionally similar to the publishing service 130 previously described with respect to FIG. 1. Similarly, the hosting service 220 is functionally similar to the hosting service 120 previously described with respect to FIG. 1.

Figure 2A:
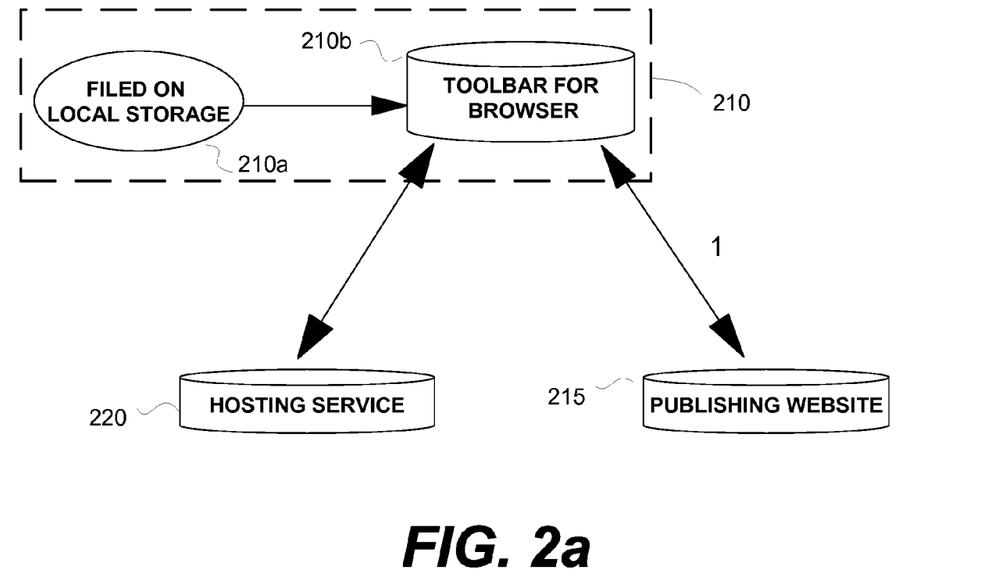
FIGS. 2a-2d illustrates a process architecture for an upload mechanism (e.g., a toolbar) for managing a process to publish a file in accordance with one embodiment of the present invention.
Figure 2B:
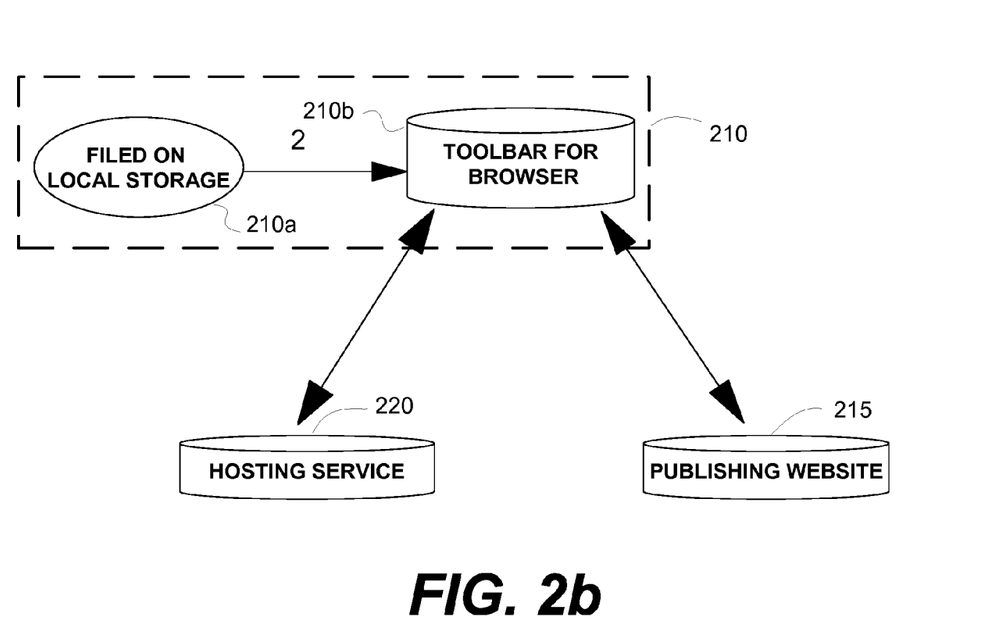

Initial reference is made to FIG. 2a, which illustrates a user opening a publishing website's page and locating the text area where files are to be published (e.g., shared, inserted, posted). The process starts with the user, through the web browser on the user system 210, opening a publishing website 215 web page and displaying it on a screen of the user system 210. The user locates a text area in the web page where files are to be published. The text area may be within a form on the web page. Next, in FIG. 2b, the user locates and selects one or more files (e.g., using their keyboard, mouse, or other input device), e.g., from the local storage 210a (visible to a user through the screen of the user system 210). The selected one or more files are dragged, using a mouse or other pointing device, from the file location shown on a screen of the user system 210 and dropped into the text area of the form on the publishing website 215 web page that is open in the web browser.

Figure 2C:
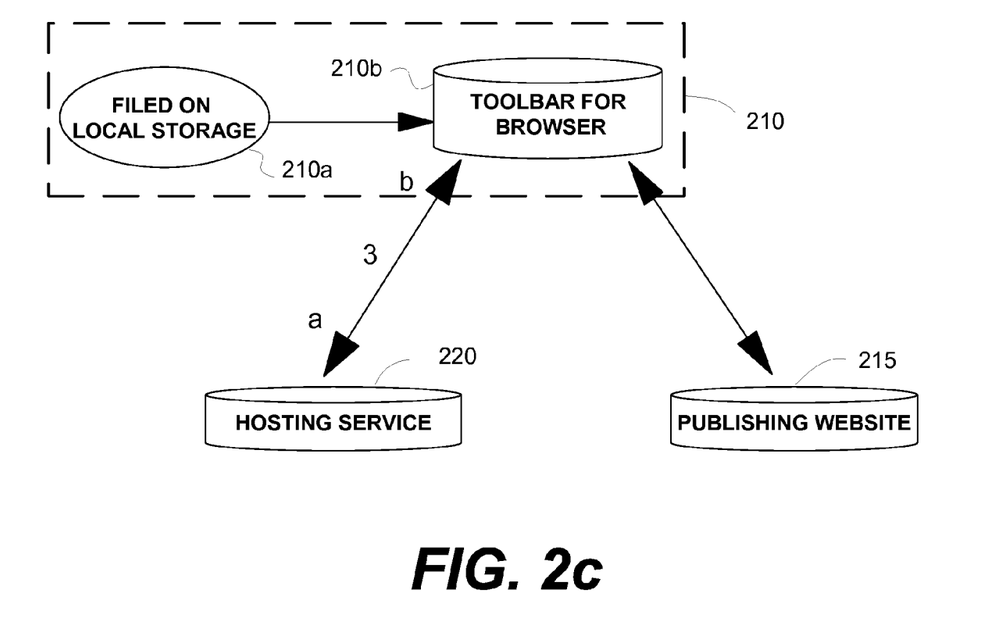

Turning to FIG. 2c, the upload mechanism (e.g., toolbar) 210b the upload mechanism 210b detects the dragging and dropping and executes a post function for all files selected by the user. The upload mechanism 210b transmits (or sends) the selected fields to the hosting service 220. The hosting service 220 receives the files and stores them in storage, for example, in a database. The hosting service 220 also transmits (or sends) a file reference, e.g. a URL, for each file to the upload mechanism 210b. The reference provides information, e.g., address information, on where the uploaded file is stored in storage, e.g., in the database, of the hosting service 220. The upload mechanism 210b receives the reference information and stores the file references. The upload mechanism 210b also includes in a main memory the reference in the text area of the form.

Figure 2D:
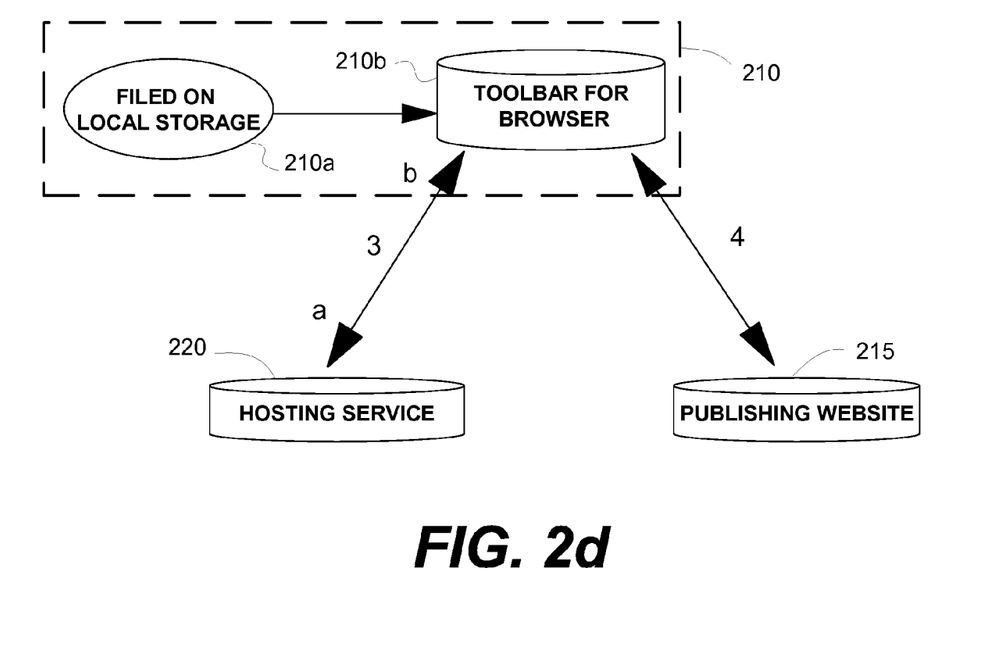

Next, in FIG. 2d, the upload mechanism 210b automatically inserts each file reference in the text area of the form where the files were originally dragged and dropped in the user system 210. Thereafter the user may confirm the publication of the one or more files by submitting the form on the publishing website 215.

In an alternative embodiment, the upload mechanism comprises a software application that can detect user actions both in the and outside of a browser application, e.g., MICROSOFT INTERNET EXPLORER or MOZILLA FIREFOX. Example of user actions include selecting one or more files from the user computer system desktop or folder (or directory) with a pointing device (e.g., a mouse, a trackball, a trackpad, a pen, or stylus); moving and dropping the selected file or files into a hypertext markup language (HTML) rendered page within the browser or into an empty browser window, i.e., with no HTML or pages loaded.

In an alternative embodiment it is noted that the upload mechanism is configured to detect an action of a user selecting one or more filed from the user computer system desktop, folder, or directory. The upload mechanism also is configured to detect the user dropping the selected file or files into an HTML text area in the web browser. Alternatively, the selected files can be dropped into a blank browser window.

In addition, upload mechanism further is configured to communicate with the hosting service system, e.g., the communication server system. The upload mechanism is configured to receive validation of the file or files, e.g., the hosting service responds on whether the files can be uploaded or not based on identification of file size, type and content. The upload mechanism can be further configured to report, e.g., a visual dialog box on the screen of the user computer system, whether a file or files could be uploaded. If the file or files are uploaded, the upload mechanism receives address (or location) reference(s) (e.g., URLs) to each uploaded file or files. Each received address reference is automatically inserted into a text area of the previously detected HTML.

Example Operational Embodiment

FIGS. 3a-3d illustrates one embodiment of an upload mechanism associated with a web browser for managing process to publish a file. In this example embodiment, the upload mechanism is configured as a toolbar (310) for a web browser application and for ease of discussion will be described in such context.

Figure 3A:
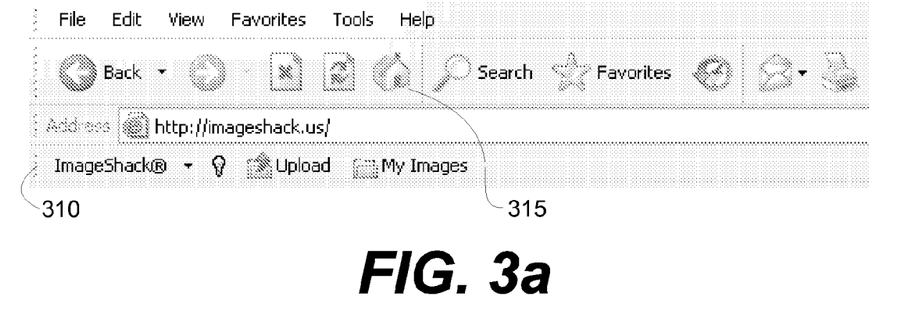
FIGS. 3a-3d illustrates one embodiment of an upload mechanism associated with a web browser for managing process to publish a file in accordance with one embodiment of the present invention.

FIG. 3a illustrates one embodiment of a toolbar 310 location relative to menu and navigation components 315 of a web browser, for example, a Microsoft Internet Explorer web browser. The toolbar 310 in this example embodiment is configured to visually appear as an extension of other menu and navigation components 315 of the web browser.

Figure 3B:
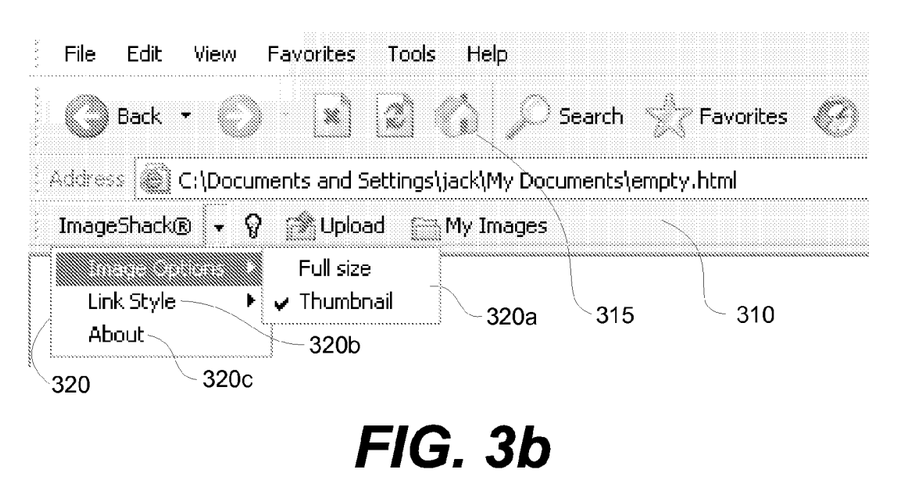

FIG. 3b illustrates one embodiment of drop down menu options 320 available upon selecting (clicking) a dropdown menu, e.g., illustrated by the ImageShack® notation. In this example embodiment, the drop down menu options 320 include image options, link style, and about. The image option 320a allows for selection between full size image for upload or thumbnail image for upload.

Figure 3C:
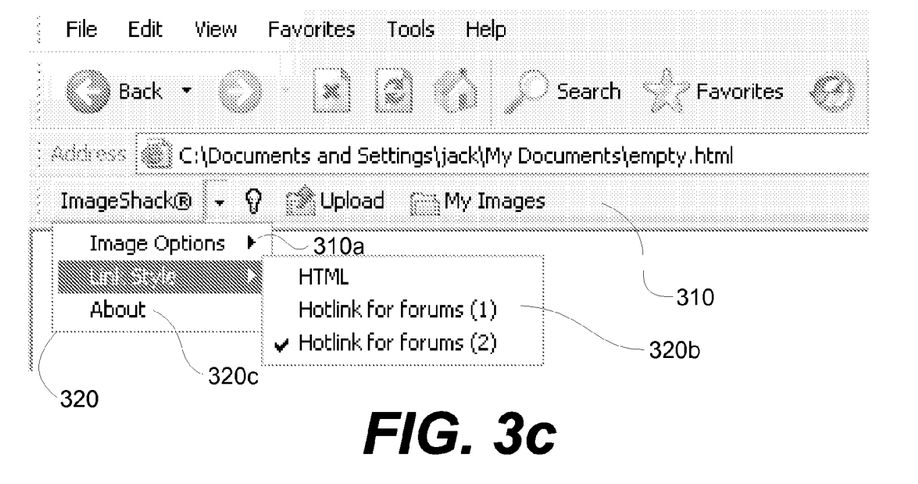

FIG. 3c illustrates the drop down menu options 320 under the link style option 320b. The link style option 320b allows for selection of a URL type depending on the destination of where the image will appear, for example, an HTML page or a forum page. Note that different forum software may require different types of URL styles to be used. For example, sites such as MYSPACE, FRIENDSTER, XANGA require generic URL type, while sites such as YONHA and phpbb type forums require non-generic Types 1 or 2. The about option 320c provides information on the toolbar and may include help and other assistance information for use of the toolbar.

Figure 3D:
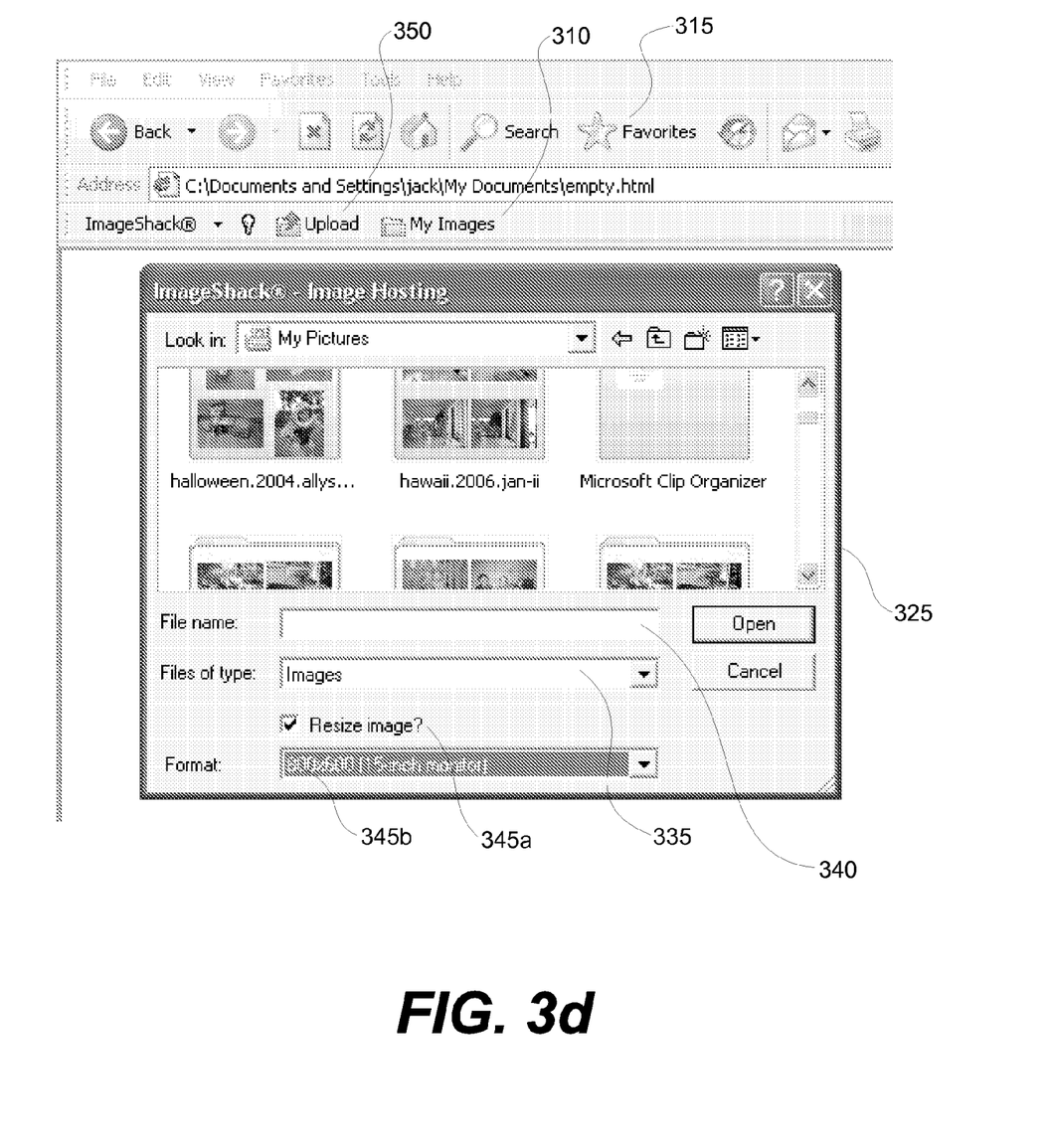

FIG. 3d illustrates a dialog box that appears when an image selection option is selected from the toolbar 310, e.g., illustrated in this example as a dialog box "Image Hosting" 325 when the upload option 350 is selected. The dialog box 325 can be configured to directly open up contents of a media file or folder, e.g., "My Pictures" in the MICROSOFT WINDOWS operating system environment. From within the dialog box 325, one more images may be selected. Although the example illustrates and describes selection of images, it is noted that in alternative embodiments, other file types, e.g., video, text, music, etc., may be designated and selected for uploading. A file type drop down menu 335 allows for identification and subsequent selection among a variety of file types from within the opened folder or file viewed through the dialog box 325. Each selected file may include a default name or can be renamed via the file name box 340. For still images (as well as for other visual files such as video), the size of the file (or resolution) can be resized relative to a format available at a destination where the image could appear. This information can be changed via selection of a resize checkbox 345a and corresponding format drop down menu 345b. Once appropriate selections are made in the dialog box, a user selects "open".

Figure 4:
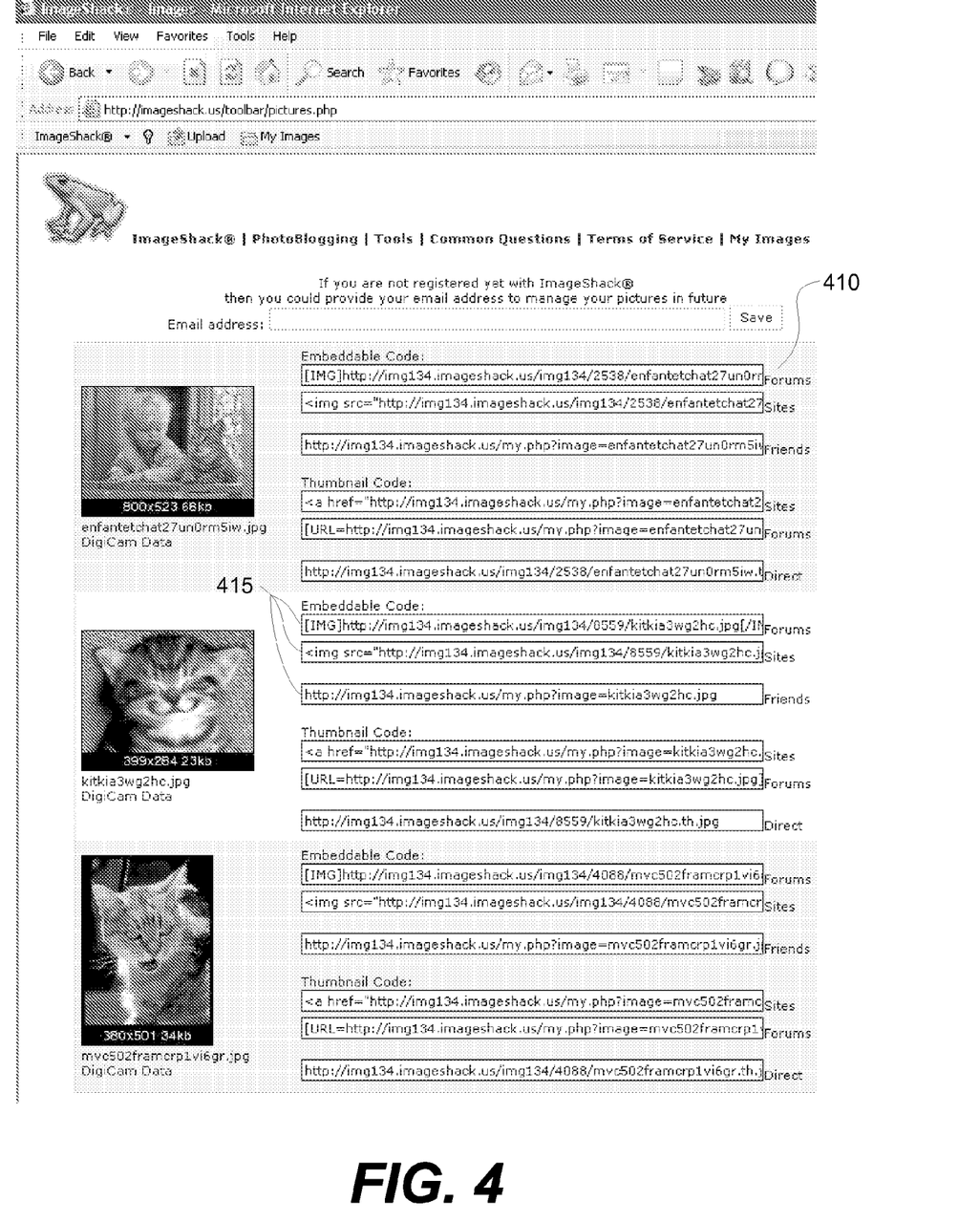
FIG. 4 illustrates address (or address pointer) information (e.g., uniform resource locator address) for each file uploaded through an enabled toolbar in accordance with one embodiment of the present invention.

Once the image (or images) is selected, the images are uploaded from the toolbar. FIG. 4 illustrates one embodiment of formatted address (or address pointer) information (e.g., uniform resource locator (URL) address) 410 for each file uploaded through the enabled toolbar. The address information was received from the hosting service in response to the hosting service receiving the uploaded images. It is noted that in one embodiment, one or more address formats 415 may be received back for each image, each address format corresponding to a different link style. In addition, specific addresses for thumbnails stored on the hosting service (e.g., for access by other third parties such as friends and family) also may be provided.

It is noted that the embedded code and the thumbnail code boxes correspond to a particular presentation format for the image (or other media file) available for a user with respect to displaying the image on the subsequently rendered web page. The presentation formats may be configured on the media file hosting system. For example, the media file hosting system can crop an image for use as a thumbnail image corresponding to the full image. In another example, the media file hosting system can select an image frame from a video file for use as a presentation image corresponding to the media file. In yet another example, the media file hosting system can use a selected image fame from the video file to crop it for use as a thumbnail corresponding to the video file.

Figure 5:
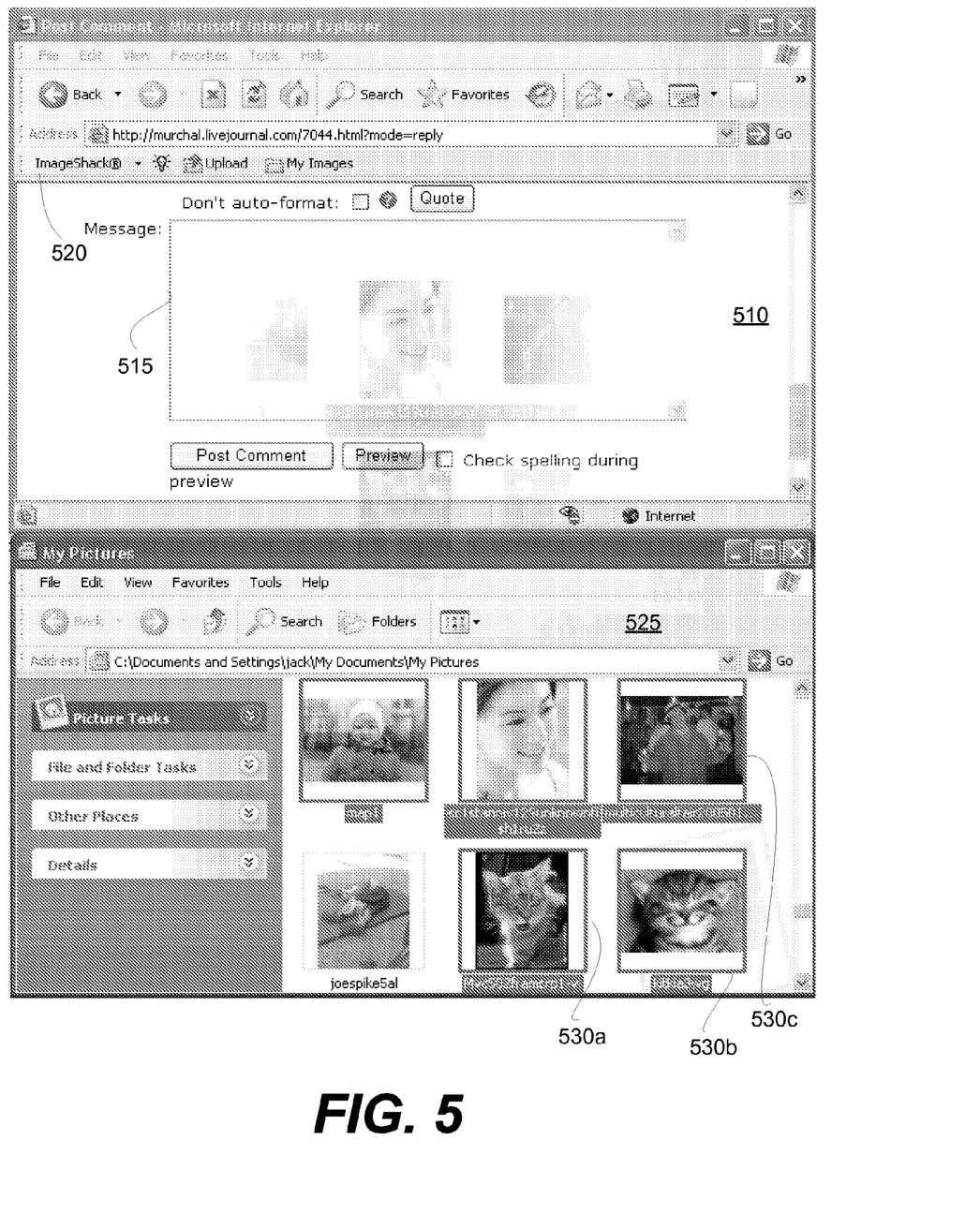
FIGS. 5a-5c illustrate a process for uploading an image to a comments section of a third-party web page in accordance with one embodiment of the present invention.
Figure 5B:
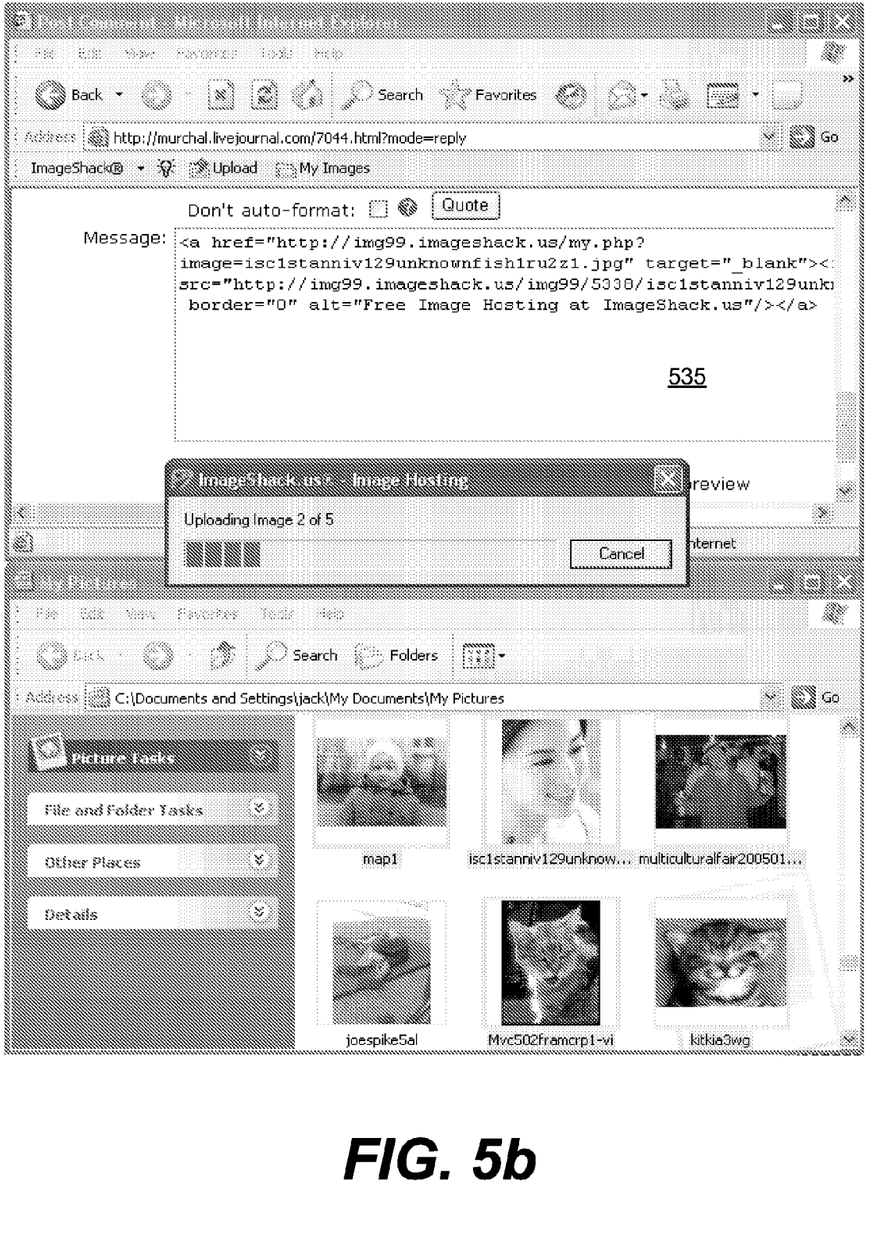
Figure 5C:
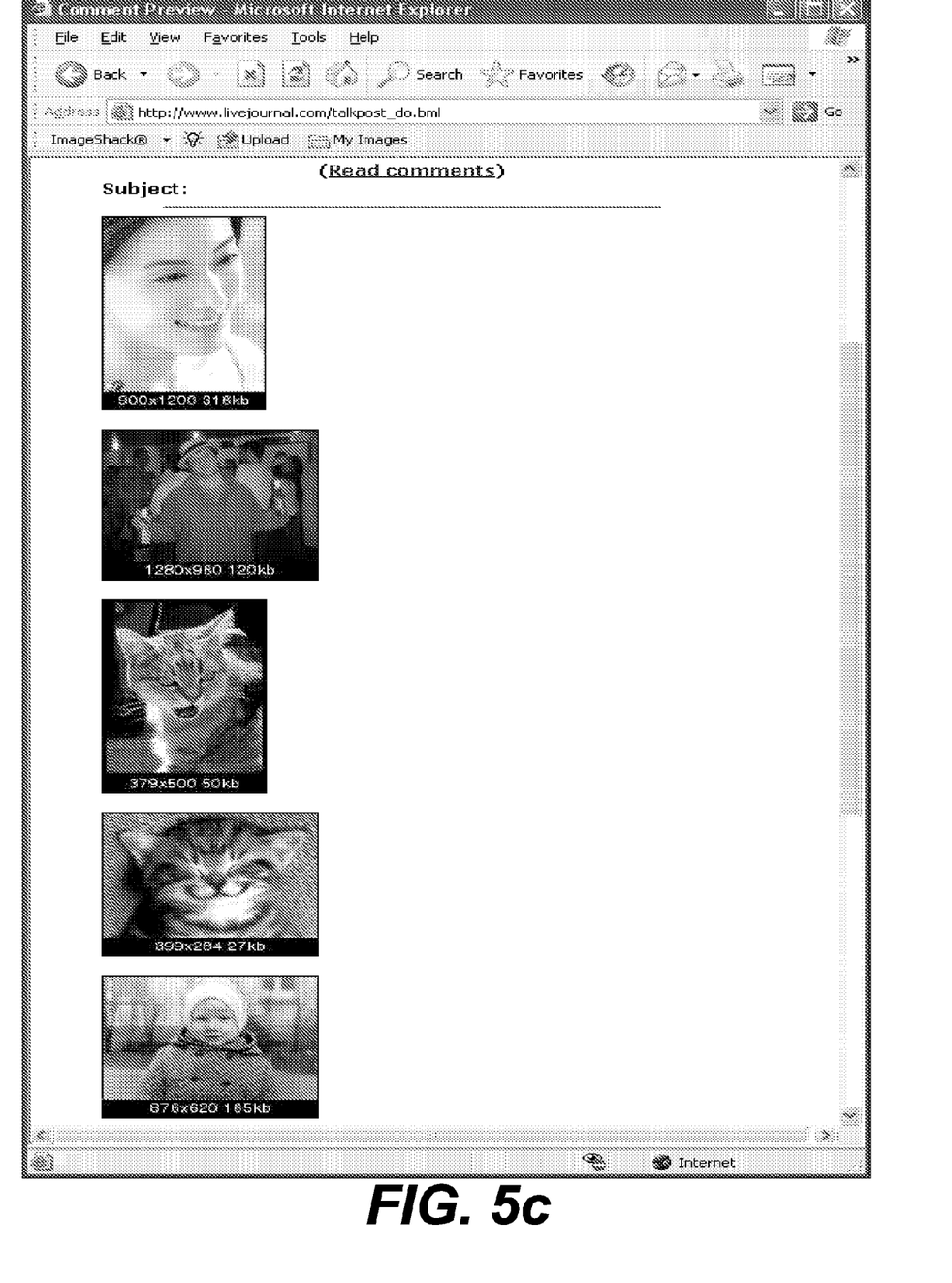

FIGS. 5a-5c illustrate a process for uploading an image to a comments section of a third-party web page in accordance with one embodiment of the present invention. In FIG. 5a, a web page is open in a web browser application in one application window 510. The web page includes a posting field, for example, a HTML text area 515. With the upload mechanism, e.g., toolbar 520, enabled, the user may open up a new window 525 that includes one or more images (in this example, in a "my pictures" application window). The user selects one or more images, e.g., by pressing and holding a CTRL key on a keyboard and clicking with a pointing device on each image for uploading 530a-e. The user then drags (e.g., pressing and holding a button on the pointing device and moving the cursor) the selected images with the pointing device from the "my pictures" application window 525 onto the text area of the web page open in the web browser application window 510. The user then drops (e.g., releases the button on the pointing device).

FIG. 5b illustrates the images being uploaded to the hosting service. As each image gets hosted in the hosting service, the hosting service returns address information to the toolbar 520, which then inserts the address information 535 into the text area of the web page. It is noted that the address information can be transmitted back to the toolbar 520 serially, i.e., as each image gets stored in the hosting service and the address information for that image gets returned to the toolbar 520, or it can be transmitted back in batch, i.e., the addresses for all the images can be transmitted back to the toolbar 520 in one group. If transmitted back serially, the toolbar 520 can post the address information 535 as it receives it or in a batch, i.e., once all together.

When the web page is subsequently rendered, the web page does not display the address information. Rather, the web browser rendering the web page used the address information to access the hosting service and retrieve each image based on the address provided for that image. Thus, to a subsequent visitor to the web page, the rendered web page shows only the images that were dragged and dropped by the user, for example, as illustrated in FIG. 5c.

The present invention beneficially allows for publishing (or uploading or posting) images to a website by dragging and dropping the image from a local file location on the user computer system to a web page opened in a browser on the user computer system. The image automatically gets transmitted to a media file hosting system and a pointer to its location on the media file hosting system is automatically into the appropriate areas of the web page. The user is not required to manually enter in address information for the image. When the web page is next visited, a web browser loads the posted images from the URLs on the web page and renders the page according to the received HTML.

Further, the features and advantages described in the specification provide a beneficial use to those making use of a system and a method as described in embodiments herein. For example, a user is provided mechanisms, e.g., by receiving and/or transmitting control signals, to control access to particular information as described herein. Further, these benefits accrue regardless of whether all or portions of components, e.g., server systems of the hosting service 120, 220 and/or the publishing service 130, 215, to support their functionality are located locally or remotely relative to the user.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

In addition, some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for simplifying uploading (or publishing or posting) of files (e.g., still or motion images) from a user computer system to a third-party website through the disclosed principles herein. For example, although the embodiments described herein were in the context of images, it is noted that other file types can be used without departing from the principles of the present invention. By way of example, the system and processes described herein may be used for motion or video images, text file, graphic files, or audio files, in the same way.

Thus, while particular embodiments and applications have been illustrated and described, it is to be understood that disclosure is not limited to the precise construction and components disclosed herein and that various modifications, changes and variations which will be apparent to those skilled in the art may be made in the arrangement, operation and details of the method and apparatus of the present invention disclosed herein without departing from the spirit and scope as defined in the appended claims.

The invention claimed is:

1. A method to automatically post a file to a website, the method comprising:
    executing a toolbar for use with a web browser;
    detecting selection of a file to publish on a preexisting web page of a third-party web site configured to display an image and deployed on a third-party web server, wherein the third party website can be any of a plurality of third-party websites;
    detecting dragging of the selected file onto a posting field within the preexisting web page rendered on a web browser, the posting field comprising a data-entry area of the preexisting web page;
    transmitting automatically the dragged file to a media file hosting system, the media file hosting system separate from the website;
    receiving automatically from the media file hosting system an address pointer corresponding to a location of the file in the media file hosting system;
    automatically populating the data-entry area of the preexisting web page by the address pointer; and
    transmitting automatically the address pointer to the preexisting web page.

2. The method of claim 1, wherein the address pointer comprises a uniform resource locator.

3. The method of claim 1 wherein the data-entry area is a text area of the preexisting web page.

4. The method of claim 1, further comprising launching a toolbar plug-in within a web browser prior to detecting selection of a file.

5. The method of claim 1, wherein detecting selection of a file comprises detecting selection of a plurality of files.

6. The method of claim 5, wherein receiving the address pointer comprises receiving an address pointer for each selected file of the plurality of files.

7. The method of claim 1, wherein the selected file is one of an image file, a video file, or an audio file.

8. The method of claim 1, wherein the third-party website does not automatically transmit the selected file to a hosting system separate from the third-party website.

9. The method of claim 1, wherein the selected file corresponds with an operating system file manager.

10. The method of claim 1, wherein the file system of the client device stores files on a local storage of the client device.

11. A computing device configured to automatically post a file to a preexisting web page of a third-party web site configured to display an image and deployed on a third-party web server, the computing device comprising at least one processor configured to:
    execute a toolbar for use with a web browser;
    detect selection of a file to publish on the preexisting web page and to detect dragging the file onto a posting field comprising a data-entry area of the preexisting web page, wherein the preexisting web page is from a third-party web site configured to display an image and deployed on a third-party web server and the third party website can be any of a plurality of third-party;
    automatically transmit the dragged file to a media file hosting system, the media file hosting system separate from the web site;
    automatically receive an address pointer from the media file hosting system, the address pointer corresponding to a location of the file in the media file hosting system,
    automatically populate the data-entry area of the preexisting web page by the address pointer; and
    automatically transmit the address pointer to the preexisting web page.

12. The computing device of claim 11, wherein the address pointer comprises a uniform resource locator.

13. The computing device of claim 11, wherein the processor is further configured to detect selection of a plurality of files for posting to the preexisting web page and to transmit the plurality of files.

14. The computing device of claim 13, wherein the processor is further configured to receive an address pointer for each selected file of the plurality of files.

15. The computing device of claim 11, wherein the processor is further configured to detect a presence of the dragged file within a posting field in the preexisting web page.

16. The computing device of claim 11, wherein the file is one of an image file, a media file or an audio file.

17. The computing device of claim 11, wherein the data-entry area is a text area of the preexisting web page.

18. The computing device of claim 11, wherein the selected file corresponds with an operating system file manager.

19. The computing device of claim 11, wherein the file system of the client device stores files on a local storage of the client device.

20. A non-transitory computer readable storage medium storing instructions executable by at least one processor, the instructions when executed cause the at least one processor to:
    execute a toolbar for use with a web browser;
    detect selection of a media file within a posting field in a preexisting web page on a third-party web site configured to display an image and deployed on a third-party web server, wherein the third party website can be any of a plurality of third-party websites;

detecting dragging of the selected file onto a posting field within the preexisting web page rendered on a web browser, the posting field comprising a data-entry area of the preexisting web page;

transmit automatically the dragged media file to a media file hosting system, the media file hosting system separate from the web site;

receive automatically an address pointer from the media file hosting system;

automatically populate the data-entry area of the preexisting web page by the address pointer; and transmit automatically the address pointer to the preexisting web page corresponding to the web site.

21. The non-transitory computer readable storage medium of claim 20, wherein the address pointer comprises a uniform resource locator.

22. The non-transitory computer readable storage medium of claim 20, wherein the media file is one of an image file, a video file, or an audio file.

23. The non-transitory computer readable storage medium of claim 20, further comprising instructions that cause the processor to detect selection of a plurality of media files.

24. The non-transitory computer readable storage medium of claim 23, further comprising instructions that cause the processor to receive automatically an address pointer for each selected media file of the plurality of plurality of media files.

25. The non-transitory computer readable storage medium of claim 20, wherein the data-entry area is a text area of the preexisting web page.

26. The non-transitory computer readable storage medium of claim 20, wherein the selected file corresponds with an operating system file manager.

27. The non-transitory computer readable storage medium of claim 20, wherein the file system of the client device stores files on a local storage of the client device.

* * * * *